United States Patent
Ono et al.

[11] Patent Number: 5,709,922
[45] Date of Patent: Jan. 20, 1998

[54] TRANSPARENT ARTICLE AND PROCESS FOR PRODUCING THE SAME

[75] Inventors: Masahiko Ono, Ibaraki-ken; Yoshishige Endo, Tsuchiura; Kazunori Kagei, Fukui-ken; Kenji Sumida, Tochigi-ken, all of Japan

[73] Assignees: Hitachi, Ltd.; Washi Kosan Company, Ltd., both of Tokyo, Japan

[21] Appl. No.: 361,504

[22] Filed: Dec. 22, 1994

[30] Foreign Application Priority Data

Dec. 27, 1993 [JP] Japan ................................. 5-330767

[51] Int. Cl.$^6$ ................................................. B32B 3/30
[52] U.S. Cl. .................... 428/156; 428/161; 428/173; 428/141; 428/142; 428/409; 428/411.1; 359/601; 359/609
[58] Field of Search ...................... 428/141, 142, 428/156, 161, 173, 195, 409, 411.1; 359/601, 609

[56] References Cited

U.S. PATENT DOCUMENTS

| | | |
|---|---|---|
| 2,432,484 | 12/1947 | Moulton . |
| 3,490,982 | 1/1970 | Sauveniere et al. . |
| 4,153,654 | 5/1979 | Maffitt et al. ............................ 264/1 |
| 4,576,850 | 3/1986 | Martens ............................ 428/156 |
| 4,732,834 | 3/1988 | Honda et al. ............................ 430/84 |
| 4,802,737 | 2/1989 | Denton ............................ 359/588 |
| 5,189,337 | 2/1993 | Endo et al. ............................ 313/479 |
| 5,316,825 | 5/1994 | Nakai et al. ............................ 428/156 |

FOREIGN PATENT DOCUMENTS

| | | |
|---|---|---|
| 4-334852 | 11/1992 | Japan . |
| 5-88001 | 4/1993 | Japan . |

OTHER PUBLICATIONS

Physics of Thin Films, 2 (1964) pp. 243–284.
Solar Energy No. 6, pp. 28–34, 1980.
Patent Abstracts of Japan. vol. 17, No. 183 (E-1348) 9 Apr. 1993 & JP A 04 334 852 (Toshiba) 20 Nov. 1992—Abstract.
IBM Technical Disclosure Bulletin, vol. 21 No. 9 Feb. 1979, NY, USA p. 3783 Lowe et al "Mechanically Produced Anti-Reflection".
Patent Abstracts of Japan vol. 17, No. 428 (P-1588) 9 Aug. 1993 & JP A 05 088 001 (Toshiba) 9 Apr. 1993—Abstract, Figures.

*Primary Examiner*—Marie Yamnitzky
*Attorney, Agent, or Firm*—Antonelli, Terry, Stout, & Kraus, LLP

[57] ABSTRACT

A transparent article made of a resin and having on its surface the fine unevenness formed by direct transfer of ultrafine particles. An unevenness transfer substrate having the ultrafine particles deposited thereon as a monolayer by using a binder, with a water/oil repellent film formed on the ultrafine particle layer, is placed in a mold, then a sufficiently deaerated fluid plastic resin is cast into the mold and heated to cause curing, then the mold is removed, and the unevenness transfer substrate and the cured resin are separated from each other. Consequently, the fine unevenness formed by the ultrafine particles is transferred to the resin surface.

12 Claims, 9 Drawing Sheets

REFRACTIVE INDEX $nf(x) = ng \cdot V(x) + n_0(1-V(x))$

TRANSPARENT ARTICLE AND PROCESS FOR PRODUCING THE SAME

BACKGROUND OF THE INVENTION

1. Field of the Invention

The present invention relates to a transparent article having an anti-reflection effect and usable as lens of eyeglasses, protective plate for architectural structures, automobiles, show cases, pictures, meters, etc., lens and various kinds of optical parts, and a process for producing such a transparent article.

2. Description of Related Art

Anti-reflection films have for long been studied and practically applied to optical devices such as cameras, microscopes and binoculars. At present, such films are used, for instance, as an anti-reflection filter for reducing the reflected light on the CRT surfaces. In these optical devices, it is required to provide an anti-reflection effect without affecting their light transmittance. A variety of anti-reflection films have been proposed, but those mainly used now are multi-layered films and heterogeneous films.

Multi-layered films have a structure in which a material having a low refractive index and a material having a high refractive index are alternately laminated to form at least three layers. Their anti-reflection effect is a synergistic effect produced by the optical interference action of each layer. Multi-layered films are discussed in Physics of Thin Films, 2 (1964), pp. 243–284.

Heterogeneous films having a reflectivity distribution in the film thickness direction can serve as an anti-reflection film when the average reflectivity of the film is lower than that of the substrate glass. Such heterogeneous films generally comprise a transparent plate having a porous surface.

A method for forming an anti-reflection film on a glass substrate is disclosed in JP-A-4-334852, according to which thin optical films are formed in two or more layers on the substrate, with a layer of fine particles deposited thereon, and the thin optical film constituting the outermost layer is etched to form a surface unevenness, so as to inhibit reflection by a combined effect of interference by the thin optical films and light diffusion by the surface unevenness.

In another method disclosed in JP-A-5-88001, a coating solution prepared by mixing the coated particles of silicon oxide or aluminum oxide in an alcohol solution of ethyl silicate is coated on a substrate and then the particles are removed to form an uneven film which produces an anti-reflection effect due to a change of film to air volume ratio.

Solar Energy No. 6, pp. 28–34, 1980, discusses means for reducing reflectance of soda glass by immersing it in an over saturated $H_2SiF_6$ solution of $SiO_2$ to make the glass surface porous.

The above mentioned multi-layer deposition method has the problem that when plastic is used for the substrate, cracks tend to develop in the substrate and the layers thereon due to difference in thermal shrinkage between the layers. This method also involves the problem of high production cost for application to a large surface area.

The methods disclosed in JP-A-4-334852 and JP-A-5-88001 are disadvantageous in that the number of the production steps is increased since a step for removing the particles is required after film formation. Also, these methods require a long-time heat treatment, giving rise to the problem of thermal deformation in case of using plastic material which is poor in heat resistance.

On the other hand, the heterogeneous film forming method comprising immersion of soda glass in a $H_2SiF_6$ solution to make the glass surface porous is incapable of producing a satisfactory anti-reflection effect as it is difficult to form fine unevenness on the film. This method also has the problem that the transmittance of the film lowers with reduction of the reflectance because the film unevenness is not sufficiently fine. The anti-reflection principle of this heterogeneous film is to minimize reflection of light by scattering the incident light by making use of unevenness of the film surface.

This anti-reflection principle of heterogeneous films is discussed here with reference to FIG. 15 of the accompanying drawings. Supposing that the glass surface has an unevenness such as shown in FIG. 15, with x representing the layer depth direction, the refractive index (nf(x)) is given by the following equation 1:

$$nf(x) = n_g \cdot V(x) + n_0(1 - V(x)) \quad (1)$$

wherein ng is the refractive index of glass, V(x) is the volume occupied by glass at x, and $n_0$ is the refractive index of air.

In this case, the refractive index varies discontinuously at the interface between air and film and at the interface between film and glass substrate as shown in FIG. 16, so that when the refractive indices at these points are represented by $n_1$ and $n_2$, respectively, the reflectance R of this layer is given by the equation 2:

$$R = 1 - \frac{4 n_0 n_1 n_2 n_g}{(n_1 n_g + n_0 n_2)^2 - (n_1^2 - n_0^2)(n_g^2 - n_2^2)\sin^2 \delta_a / 2} \quad (2)$$

$$\delta_a = 2\pi(n_1 + n_2) da / \lambda$$

wherein "da" denotes the depth of the unevenness (See FIG. 15).

In case $n_0=1.0$, $n_1=1.1$, $n_2=1.477$ and $n_g=1.53$ in the above equation, the lowest reflectance is obtained when the surface unevenness (da) is 100 nm. Actually, however, it is difficult to form such a fine unevenness. The present inventors have previously proposed an anti-reflection body which satisfies both requirements of low reflectance and high transmittance by forming said unevenness with ultrafine particles directly coated as a film on the surface of a transparent substrate, and a method for forming such an anti-reflection body. It is remarkable that the transmittance is enhanced and an excellent anti-reflection effect is obtained especially when the ultrafine particles of $SiO_2$ with little scatter of particle size are deposited as a monolayer on a glass substrate. As a result of further researches, it was found that by transferring the fine unevenness on the ultrafine particle film surface to other articles, it is possible to form an effective anti-reflection layer on the transferred articles with unchanged quality and at low cost. Also, in this case, thermal cracking hardly occurs since said fine unevenness is formed by direct transfer to a substrate.

SUMMARY OF THE INVENTION

An object of the present invention is to provide transparent articles having a high transmittance and a high anti-reflection effect by making use of fine unevenness formed by monolayer deposition of ultrafine particles, and a method for producing such transparent articles.

In order to accomplish the above object, the present invention provides a transparent article made of a resin and having on its surface fine indentations formed by direct transfer of a configuration of ultrafine particles.

In an aspect of the present invention, there is provided a transparent article having a plastic resin layer formed on a transparent substrate, said plastic resin layer having on its surface fine indentations formed by direct transfer of a configuration of ultrafine particles.

In another aspect of the present invention, there is provided a transparent article made of a plastic resin and having on its surface fine indentations formed by direct transfer of a configuration of ultrafine particles, wherein the inside of said recesses or the recesses are covered with a transparent resin.

In still another aspect of the present invention, there is provided a transparent article having a plastic resin layer provided on a transparent substrate, said plastic resin layer having on its surface fine indentations formed by direct transfer of a configuration of ultrafine particles, wherein the inside of said indentations or the indentations are coated with a transparent resin.

The indentations on the transparent article according to the present invention may have substantially continuous dimple-like or semispherical shape, and their depth may be, for instance, 20–300 nm.

In the above transparent article, the transparent substrate may be made of glass or plastic resin, more specifically it may be a plastic product selected from the group consisting of lens of eyeglasses, optical lens, windshield and window glass, materials for show cases, show window or display cases for pictures, and shields for gauges and shields for image display apparatuses.

In still another aspect of the present invention, there is provided an anti-reflection article using any one of said transparent articles having a light reflection preventive effect.

In yet another aspect of the present invention, there is provided a protective plate comprising any one of said transparent articles, said protective plate being designed to protect an exhibit or a thing on display.

In a further aspect of the present invention, there is provided a process for producing a transparent article by supplying a fluid resin on to the surface of substrate provided with an ultrafine particle film having an unevenness surface formed by ultrafine particles so as to cover said surface, and curing said resin under pressure so as to transfer said unevenness to the surface of the cured resin.

In still another aspect of the present invention, there is provided a process for producing a transparent article comprising pressing an uneven surface of an ultrafine particle film formed on a substrate on a fluid resin provided on a transparent substrate; said uneven surface having been formed by coating a coating solution containing ultrafine particles, and curing said resin so as to transfer said uneven surface of said ultrafine particle film on the surface of the cured resin.

In the process for producing a transparent article according to the present invention, the resin may be cured by heating, photopolymerization or cooling.

Also, in the process of this invention, said transfer of unevenness (hereinafter sometimes referred to merely as transfer) to the resin may be effected under pressure. The ultrafine particle film provided on the substrate is one formed by depositing ultrafine particles as a monolayer on the substrate. This ultrafine particle film may have been subjected to a water and/or oil repellency treatment on the surface. This water and/or repellency treatment is carried out using a treating agent containing a silyl compound selected from chlorosilane compounds, alkoxysilane compounds and fluoroalkylsilane compounds.

In still another aspect of the present invention, there is provided a process for producing a transparent article comprising a first step in which a substrate on its surface an ultrafine particle film having a surface unevenness formed by ultrafine particles is placed in a mold so that said ultrafine particle film constitutes a part of the mold; a second step comprising filling a fluid resin in a cavity in said mold; a third step comprising curing said fluid resin; a fourth step comprising disassembling said mold; and a fifth step comprising separating the cured resin from the substrate.

According to the process of the present invention, a substrate having a monolayer of ultrafine particles thereon is used as matrix, and with this matrix properly placed in a specific mold, a fluid resin which is to form a transparent article is cast into the mold and cured, followed by separation of the cured resin from the matrix, whereby the fine unevenness of the ultrafine particle film is transferred to the cured plastic resin surface. It is thus possible to form a fine unevenness comprising dimple-like indentations which can not be formed by conventional mechanical working or etching.

Also, when the substrate having a monolayer of ultrafine particles thereon is pressed against a fluid resin disposed on the surface of a transparent substrate, the unevenness formed by said layer of ultrafine particles runs into the fluid resin, allowing faithful transfer of the unevenness.

A water and/or oil repellency treatment applied on the ultrafine particle layer surface facilitates separation of the unevenness-transferred cured plastic resin from the ultrafine particle layer surface of the substrate.

In the transparent article according to the present invention, the unevenness formed on the transparent substrate surface has a prominent anti-reflection effect explained above using the equations 1 and 2, due to faithful transfer of the configuration of ultrafine particles. Also, such unevenness is of a fine size that gives no influence on transmittance.

When the ultrafine particles having the particle size of 40–600 nm are used, the unevenness formed thereby has a depth half of the particle size. Thus, in this case, an unevenness having a depth of 20–300 nm suited for prevention of light reflection can be formed. By covering the inside of the unevenness or covering the unevenness with a transparent resin, it is possible to prevent fouling of the surface.

The term "fluid resin" as used herein denotes a resin flowable or movable like a liquid or a fluid. In other words, the term "fluid resin" includes any of liquid oligomers, liquid polymers and thermo-meltable resins.

The term "fine indentations" as used herein means a series of indentations having a diameter of 40 to 600 nm and a depth of 20 to 300 nm, and being adjacent to each other.

The term "unevenness" as used herein means a state of the surface having said fine indentations, or the indentations themselves.

DETAILED DESCRIPTION OF THE INVENTION

Figure 1:
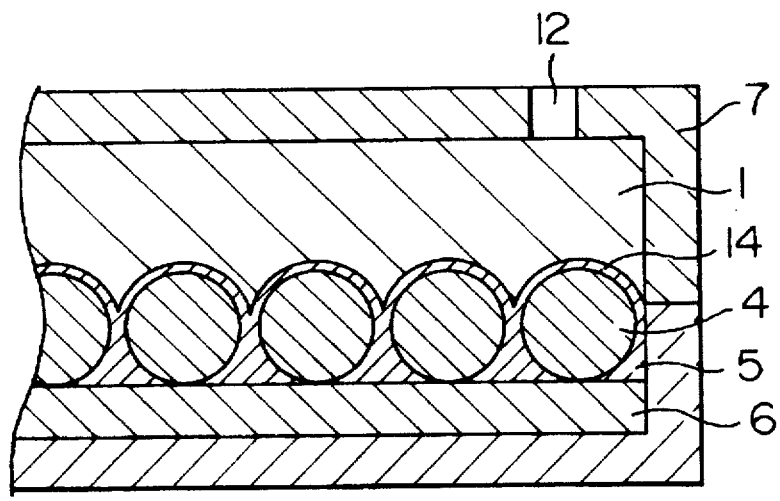
FIG. 1 is a diagrammatic sectional view illustrating the unevenness transfer method in the first embodiment of the present invention.

The present invention will be described with reference to its examples. First, the constituent requirements of the present invention will be explained.

(Transparent substrate to be transferred)

The transparent substrate to be transferred is not subject to specific quality restrictions as far as it has lower melting point than the ultrafine particles forming a coating film on the substrate or it is soft enough to serve as matrix. However, in view of the strength and chemical resistance of the unevenness formed by transfer, thermosetting resins are preferably used as substrate material. But this does not apply in case the product is used for optical articles, and in this case thermoplastic resins may as well be used. Also, in case transfer is performed under pressure, the shape of the transparent substrate may be plate or film, or the substrate may have a curvature.

The thermosetting resins usable as substrate material in the present invention include melamine resin, epoxy resin, unsaturated polyester resin, polyimide resin, silicon resin, phenol resin, urea resin, aniline resin, diallyl phthalate resin, alkyd resin, polyurethane resin and diethylene glycolbisallyl carbonate resin. Organosiloxane compounds are also usable.

The thermoplastic resins usable for said purpose include acrylic resin, PMMA (polymethyl methacrylate), polycarbonate resin and styrene resin. Acrylic resin is most suited for injection molding and preferred as lens material. Various types of curing agent may be added for causing curing at low temperatures or for promoting curing. Typical examples of such curing agents are epoxy resin and organosilicon resin.

(Ultrafine particles used for forming unevenness)

The term "ultrafine particles" is used in this invention to refer to the particles with a size of submicron order. The ultrafine particles used in the present invention are not specifically defined as far as they are spherical or have a shape close to sphere, but the particles having an average size (diameter) of about 40–600 nm are preferably used. When the average size of the particles is less than 40 nm, the unevenness formed by the particles may not be transferred in a satisfactory manner and the surface of the transparent substrate may become too flat, making it unable to obtain a desired anti-reflection effect. When the average particle size is greater than 600 nm, although a desired anti-reflection effect can be obtained, the transferred unevenness of the transparent substrate becomes too large, resulting in enlargement of diffused reflection, which may cause clouding of the product and lowering of its transmittance. Thus, the particle size of the ultrafine particles used in this invention preferably falls in the range of 40–600 nm. These particles may be either limited in the particle size distribution or may have rather broad particle size distribution within the above-defined range.

(Substrate having formed thereon an ultrafine particle film for transfer of unevenness)

The substrate having an ultrafine particle film, which serves as a matrix for transfer of unevenness, may be for instance, a glass plate, a plastic plate, a metal plate, a plastic film or the like, but in the Examples shown below, glass and metal were used in view of adhesiveness of the ultrafine particle film to the substrate. The surface of the substrate on which an ultrafine particle film is to be formed may not necessarily be planar; it may have a curvature like lens or may be cylindrical. The ultrafine particle film may be formed on one side or both sides of the substrate. The substrate surface is preferably subjected to a cleaning treatment with an alkali, hydrofluoric acid or a neutral detergent before forming an ultrafine particle film.

(Method of forming ultrafine particle film used for transfer of unevenness)

Conventional coating methods such as dip coating, spray coating, spin coating, etc., may be used for forming an ultrafine particle film.

In the case of dip coating, the substrate is placed in a container filled with a coating solution comprising a mixture of ultrafine particles and a binder, and the surface of the solution in the container is lowered down. Alternatively, the substrate is first placed in a container, then the coating solution is gradually poured into the container until it is filled up with the solution, and then the substrate is pulled up. This dip coating method is suited for coating of the articles having a complicated surface configuration.

Curing of the ultrafine particle film after coating may be effected by applying hot air, ultraviolet rays, infrared rays or the like. The heating temperature is decided considering the threshold temperature that the coated substrate can endure, but usually the coating film is dried at 50°–100° C. in the case of resin substrate and 100°–400° C. in the case of glass substrate.

In case an ultraviolet curing resin is used as binder, ultraviolet rays are applied for curing.

(Coating solution for forming ultrafine particle film for transfer of unevenness)

A coating solution containing a predetermined amount of ultrafine particles and a binder is used for forming an ultrafine particle film for transfer of unevenness in the present invention.

When the substrate on which said ultrafine particle film is to be formed is glass or a metal (such as copper or stainless steel), $Si(OR)_4$ (R=alkyl) is preferably used as binder. Since $Si(OR)_4$ is decomposed, the coating solution is prepared by adding water and a catalyst such as nitric acid. When the substrate is plastic, it is preferred to use a combination of $Si(OR)_4$ (R=alkyl) and a coupling agent having a functional group for plastic as binder.

In preparation of the coating solution, ethyl silicate [$Si(OC_2H_5)_4$] is dissolved in ethanol, followed by addition of $H_2O$ for hydrolysis and $ENO_3$ as catalyst, and to this solution are added 10% by weight of ultrafine particles of $SiO_2$. The solution pH is adjusted to allow sufficient dispersion of the particles.

After this solution has been applied on the substrate by a method such as mentioned above, it is dried to cause decomposition of ethyl silicate [$Si(OC_2E_5)_4$] to form a film. Since $SiO_2$ formed by decomposition can serve as a binder, the ultrafine $SiO_2$ particles added to the solution are strongly bonded to the binder, and they are also firmly attached to the surface of the substrate. By this method, it is possible to form a uniform continuous unevenness with the ultrafine $SiO_2$ particles arranged as a monolayer on the substrate surface.

(Water and/or oil repellents)

For facilitating separation of the ultrafine particle film from the transparent substrate after transfer has been completed, a treating agent containing at least one kind of silyl compound selected from chlorosilane compounds, alkoxysilane compounds and fluoroalkylsilane compounds is used. Examples of the chlorosilane compounds usable for said purpose include $CH_3SiCl_3$, $(CH_3)HSiCl_2$, $(CH_3)_2SiCl_2$ and $(CH_3)_3SiCl$. Examples of the alkoxysilane compounds include $CH_3SiOCH_3$, $(CH_3)_2Si(OCH_3)_2$, $CH_3Si(OC_2H_5)_3$ and $(CH_3)_2Si(OC_2H_5)_2$. Examples of the fluoroalkylsilane compounds include $CF_3CH_2CH_2Si(OCH_3)_3$, $CF_3CH_2CH_2SiCl_3$ and $CF_3(CF_2)CH_2CH_2SiCH_3Cl_2$.

In silyl compound treatment of the surface of said ultrafine particle film formed by a combination of ultrafine particles and binder, it is possible to easily induce the reaction to effectuate siloxane bonding without applying any specific pretreatment since both of the ultrafine particles and the binder have a large quantity of hydroxyl groups in their surfaces. This treatment can be accomplished by merely blowing the compound vapors to the ultrafine particle film in case the treating agent is a fuming solvent such as $(CH_3)_2SiCl_2$. In the case of an alkoxysilane compound or a fluoroalkylsilane compound, the compound may be coated on the substrate having an ultrafine particle film thereon by an ordinary coating method such as dip coating, spray coating or spin coating.

The chlorosilane compounds used for water repellency treatment function to substitute the active hydrogen of the hydroxyl group (OK) in the surfaces of the ultrafine particles and the binder with a silyl group ($R_3S$) (silylation). For example, in the case of trimethylchlorosilane ($Me_3SiCl$), when it is reacted with Si—OH in the ultrafine particle film surface, Si—OH+$Me_3SiCl$ changes into Si—$OSiMe_3$+HCl, so that the outermost layer is composed of $Me_3$ and thus provided with water repellency. As a result of this reaction, the single molecular layers are strongly bonded and the outermost layer comprises $CH_3$ groups alone and is provided with water repellency. This water and/or oil repellency treatment allows easy separation of the ultrafine particle film from the matrix substrate, leaving the unevenness of the ultrafine particle film unaffected, after transfer has been completed.

(Unevenness transfer method)

Transfer of the unevenness of the ultrafine particle film surface can be accomplished as follows. A substrate having an ultrafine particle film formed thereon in the manner described above is placed in a mold, and then a transparent base material comprising a liquid thermosetting resin to which the unevenness of the ultrafine particle film is to be transferred is placed in the mold after sufficient deaeration. When the transparent base material was cured and solidified by cooling, heating or photopolymerization, the mold is disassembled and the substrate and the transparent base material are separated from each other. In order to facilitate release of the base material from the ultrafine particle film after transfer of the unevenness, a releasing agent may be mixed in the base material, or a water and/or oil repellency treatment may be applied thereto. The transparent base material to which the unevenness has been transferred is finished into a desired shape and put to practical used as various commercial articles such as shields for exhibits, shields for gauges, shields for image display apparatus etc., ophthalmic glasses, window glass of architectural structures, glass for vehicles, especially windshield, lenses, and various optical parts.

In another transfer method, a substrate having an ultrafine particle film formed thereon is fixed in an injection mold, then the thermoplastic resin fed into the hopper of the injection molding machine is heated to be molten by a cylinder and supplied to the nozzle portion, and this molten resin is injected to the substrate from the nozzle end and cured, thereby transferring the unevenness of the substrate surface to the cured resin.

A release agent may be mixed in the thermoplastic resin, or a water and/or oil repellency treatment may be applied to the surface of the substrate having an ultrafine particle film formed thereon, or both treatments may be applied.

In still another transfer method, a liquid thermosetting resin is coated thinly on the surface of a transparent substrate to which unevenness is to be transferred, then a substrate having an ultrafine particle film formed thereon is pressed against said transparent substrate, followed by curing of the resin by cooling, heating or photopolymerization, and then the substrate having an ultrafine particle film formed thereon is separated from the transparent substrate, thereby transferring the unevenness of the ultrafine particle film to the transparent substrate.

The transfer position can be defined and the workability is improved when the transparent substrate (the article to which unevenness is to be transferred) is designed to serve as a female mold and the substrate having an ultrafine particle film is designed to serve as a male mold.

The unevenness may be transferred to one side or both sides of the transparent substrate.

According to the above-described process in which fine unevenness is provided by transfer to form an anti-reflection layer, it is possible to easily form a very fine and uniform unevenness which can not be formed by conventional mechanical working or etching. Also, since this process makes it possible to perform transfer repeatedly on a plurality of transparent products with a single piece of substrate having an ultrafine particle film formed thereon, the transparent articles having an anti-reflection effect can be produced with unchanged quality and at low cost.

An embodiment of the present invention is described below. The present invention is of course not limited to this and other embodiments shown below.

Figure 17:
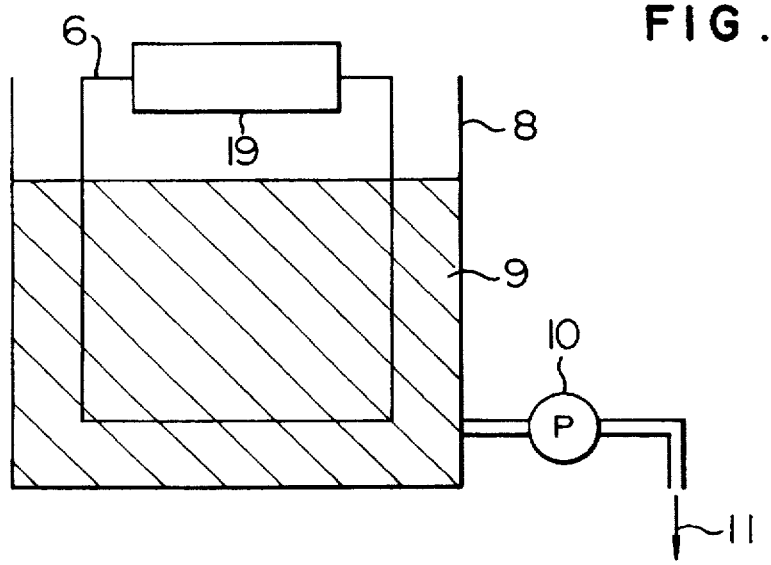
FIG. 17 is a schematic drawing illustrating a method of forming an ultrafine particle film on a substrate usable for transfer of unevenness.
Figure 18:
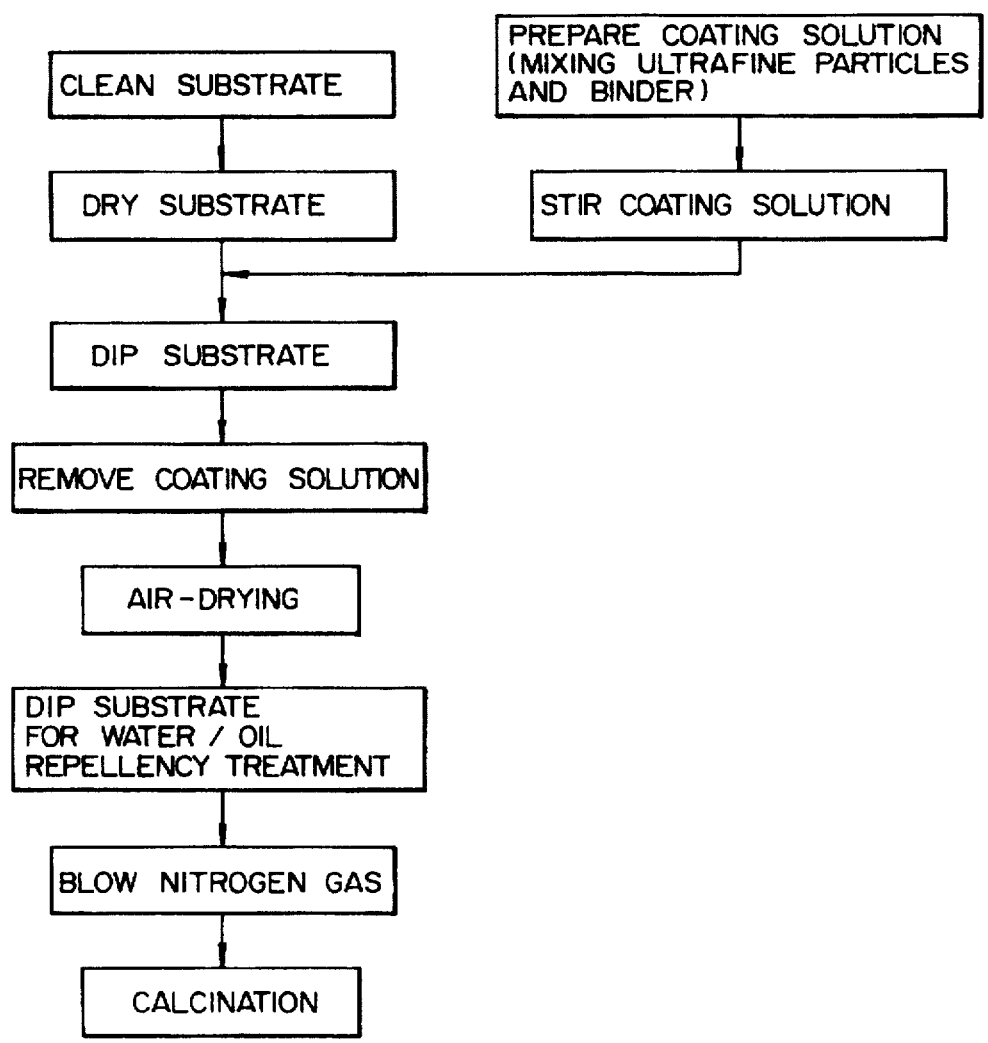
FIG. 18 is a flow chart illustrating the procedure of forming an ultrafine particle film on a substrate.

Referring to FIG. 17, there is shown a schematic illustration of a method (dipping method) of forming an ultrafine particle film on a substrate which serves as a transfer matrix. The procedure of forming the ultrafine particle film for transfer of unevenness is shown in FIG. 18. An alkali surface treated glass substrate 6 is fixed to a jig 19 and placed in a coating bath 8. The bath 8 is filled with a coating solution 9 comprising a mixture of ultrafine $SiO_2$ particles having an average size of 200 nm and $Si(OR)_4$. Then, the coating solution is discharged out of the bath 8 by using a pump 10 so that the surface of the coating solution will be lowered at a rate of 5 mm/sec. At this stage, the ultrafine particles are deposited on the glass substrate surface. Thereafter, in order to facilitate separation of the ultrafine particle film formed on the substrate from the transferred article, the glass substrate having an ultrafine particle film formed thereon is dipped in a solution comprising a siloxane mixed with 5 wt % of a fluoroalkylsilane compound for 20 minutes to impart water and oil repellency to the ultrafine particle film surface. Lastly, the substrate having an ultrafine particle film coating thereon is taken out of the solution, dried by nitrogen blowing and then left in a 200° C. oven for 30 minutes to dry the film.

Figure 19:
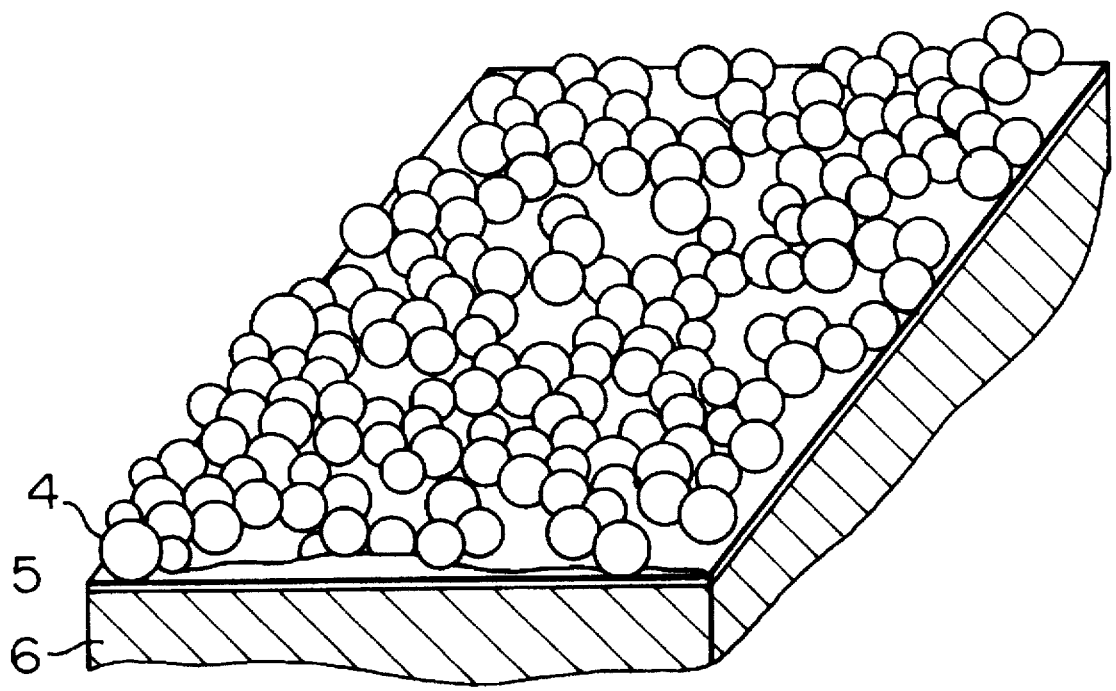
FIG. 19 is a perspective view, partly shown in section, of a substrate having formed thereon an ultrafine particle film used for transfer of unevenness.
Figure 20:
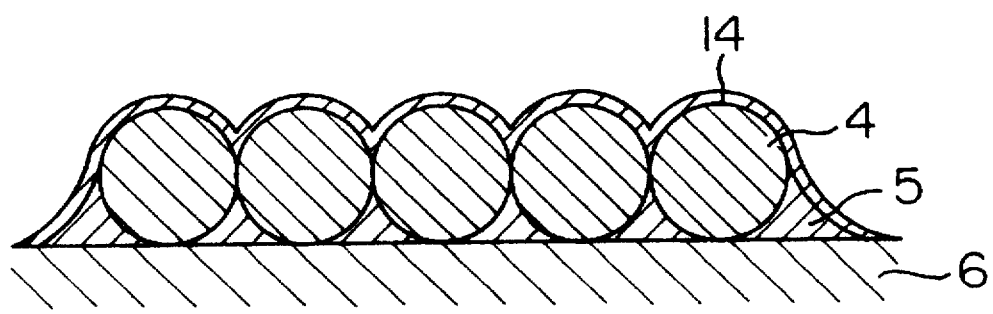
FIG. 20 is a sectional view showing disposition of ultrafine particles on the surface of a substrate.

FIG. 19 is a perspective view, with parts shown in section, of the thus obtained substrate having an ultrafine particle film for transfer of unevenness, and FIG. 20 is a partial enlarged sectional view thereof. In FIGS. 19 and 20, reference numeral 4 designates the ultrafine particles, 5 the binder, 6 the substrate, and 14 the water and oil repellent layer. FIG. 20 represents the case where the ultrafine particles having a narrow particle size distribution were used.

The fine surface unevenness of said ultrafine particle film is transferred to a transparent base material in the manner described below.

Figure 2:
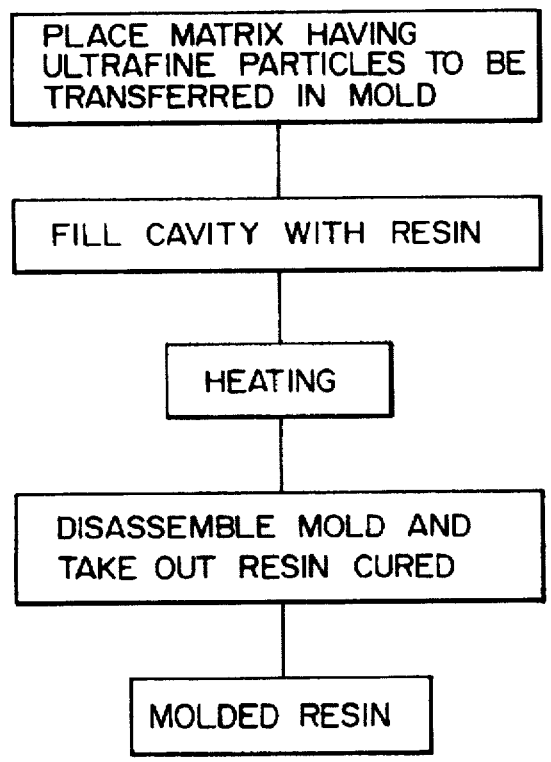
FIG. 2 is a flow chart illustrating the unevenness transfer procedure in the first embodiment of the present invention.

A schematic illustration of transfer is shown in FIG. 1, and the procedure of transfer is shown in FIG. 2.

Figure 3:
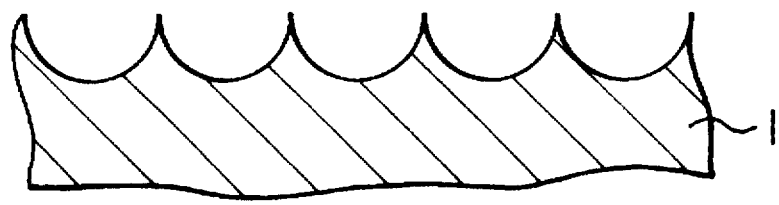
FIG. 3 is a sectional view of the resin after transfer of unevenness in the first embodiment of the present invention.
Figure 4:
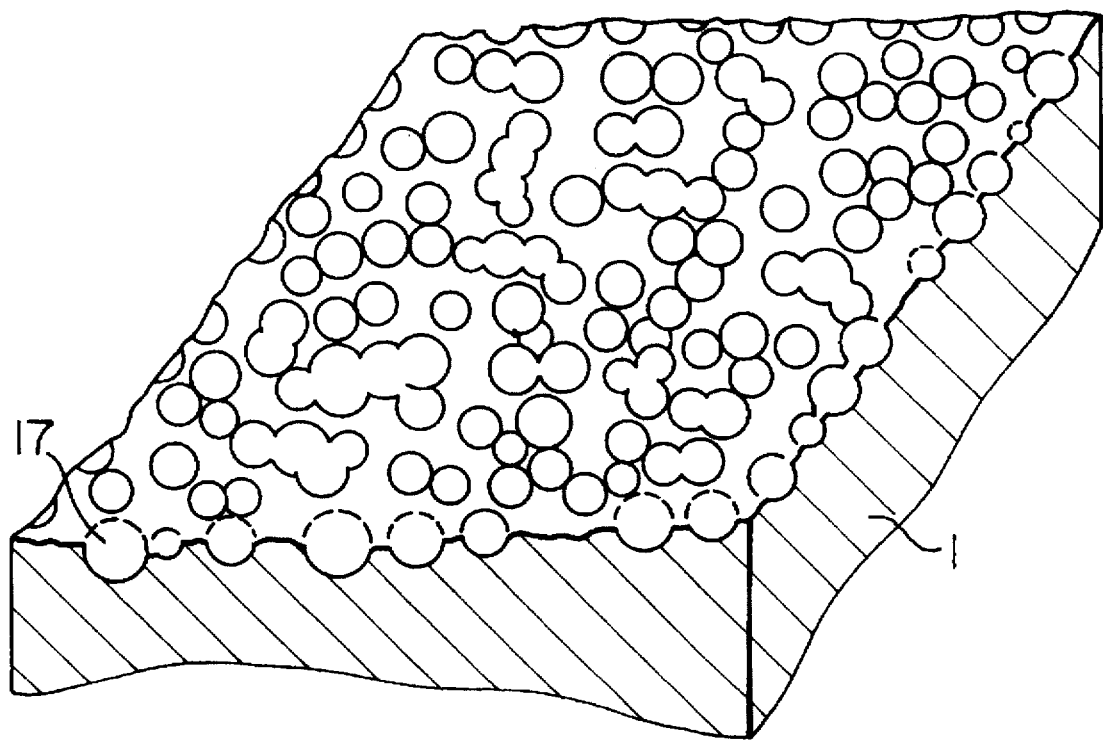
FIG. 4 is a perspective view of the transferred portion of the resin after transfer of unevenness in the first embodiment of the present invention.

An unevenness transfer substrate 6 having an ultrafine particle layer formed by depositing the ultrafine particles 4 having a narrow particle size distribution with a binder 5 by the method described above, with a water and oil repellent film formed on its surface, is placed in a mold for transfer 7. Then a liquid epoxy resin 1 which has been sufficiently deaerated and mixed with a releasing agent is charged into the mold 7 from an inlet opening 12 and heated for curing. After sufficiently cured, the resin 1 is taken out of the mold 7. The sectional shape of the resin 1 including the transferred portion in this state is shown in FIG. 3. By properly selecting the mold 7, the moldings can be applied to various types of commercial products such as lenses. A sectional perspective view of the unevenness transferred surface of the resin 1 obtained from the above transfer operation is shown in FIG. 4. The convexities 4 of the ultrafine particles of the transfer matrix are closely transferred to provide the concavities 17. By this method, the fine unevenness formed by the ultrafine particles deposited on the substrate surface can be faithfully transferred to the resin surface. The reflectance of the unevenness-transferred article at the wavelength of 550 nm was less than 1%, and thus an excellent anti-reflection effect could be obtained.

Figure 5:
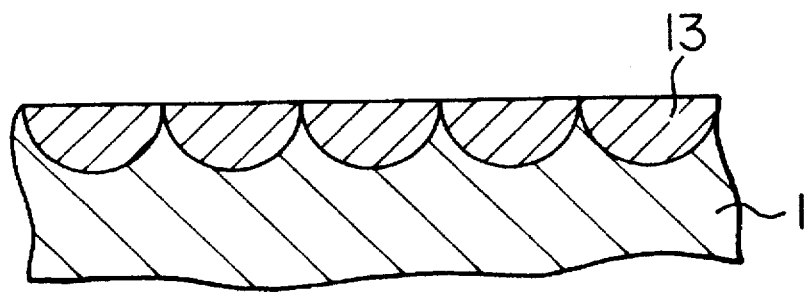
FIG. 5 is a sectional view showing a situation where a low-refractivity resin has been applied to the dimples in the transferred portion of the matrix resin in the first embodiment of the present invention.

By applying a hard coating layer 13 of a low-refractivity material on the unevenness transferred surface of resin 1 as shown in FIG. 5, it is possible to improve scuff resistance and weathering resistance without impairing the anti-reflection effect.

The above-described embodiment of the invention concerns the case where epoxy resin, which is a thermosetting resin, was used as the transparent base material, but transfer can of course be accomplished in the similar way when using a thermoplastic resin. In the latter case, however, the resin charged into the mold is of high temperature, and the resin is cured by cooling after charged into the mold in the procedure shown in FIG. 2.

Figure 6:
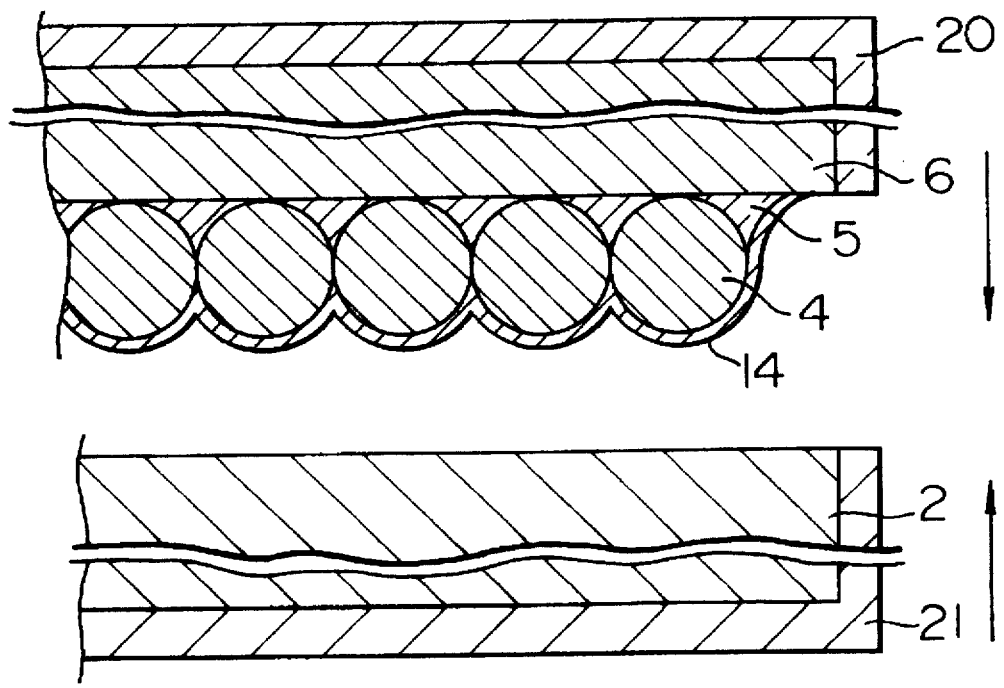
FIG. 6 is a diagrammatic sectional view illustrating the unevenness transfer method in the second embodiment of the present invention.
Figure 7:
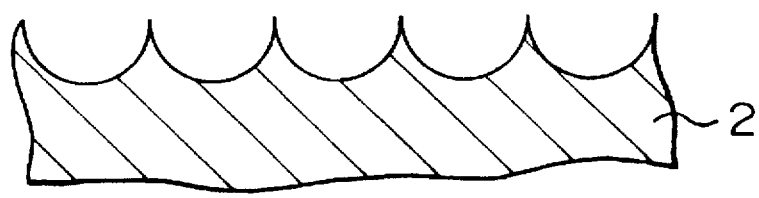
FIG. 7 is a sectional view of the resin after transfer of unevenness in the second embodiment of the present invention.

A second embodiment of the invention is illustrated in FIGS. 6 and 7. A glass substrate 6 having an ultrafine particle film formed on its surface in the same way as in the first embodiment described above is properly set in a male mold 20. Polystyrene 2 in a form of a plate or pellets is placed in a female mold 21 and heated for softening it. The male mold is pressed into the female mold. After the resin has been cured at normal temperature, the male mold 20 is removed from the female mold 21. Then said polystyrene 2 in the female mold is withdrawn in this embodiment, the sectional shape of the resin (polystyrene) 2 after transfer is as shown in FIG. 7, which is same as in the first embodiment (see FIG. 4). This embodiment is advantageous in that the transfer molding cycle is fast as compared with the first embodiment.

Figure 8:
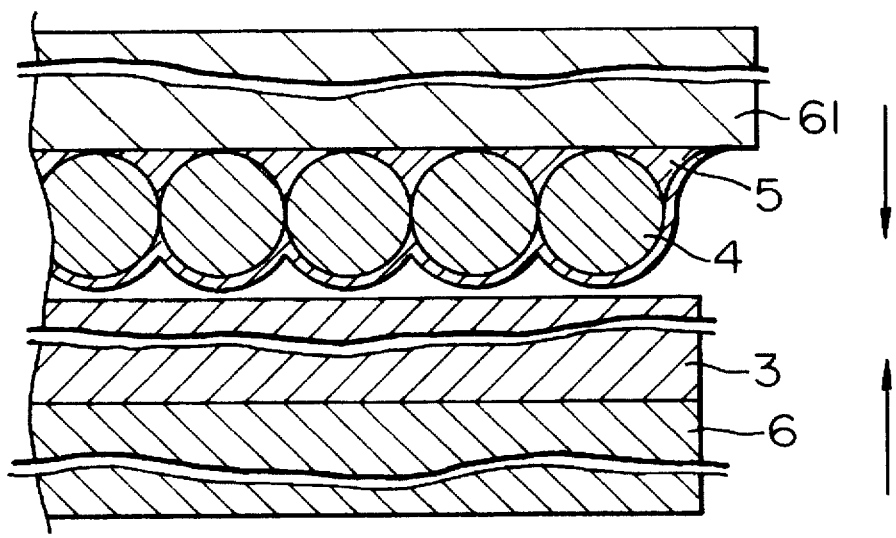
FIG. 8 is a diagrammatic sectional view illustrating the unevenness transfer method in the third embodiment of the present invention.
Figure 9:
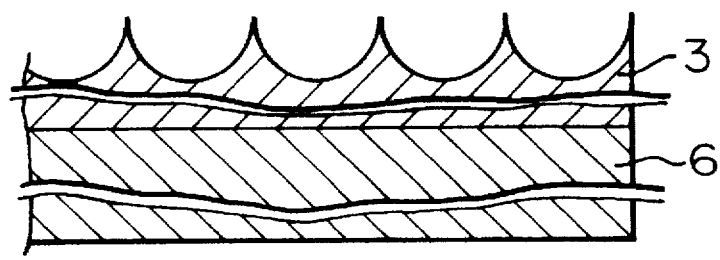
FIG. 9 is a sectional view of the resin after transfer of unevenness in the third embodiment of the present invention.

In a third embodiment of the invention illustrated in FIGS. 8 and 9, an approximately 2 μm thick silicon resin film 3 is formed on a glass substrate 6 by roll coating, and while the film is still flexible, transfer is carried out under pressure by using a substrate 61 made of a flexible material having on its surface a film of ultrafine particles having an average size of 0.6 μm (600 nm). Then, after the resin film 3 has been cured, the substrate 61 having an ultrafine particle film 4 is removed. FIG. 9 shows a sectional view of the resin film after transfer. According to this method, transfer can be accomplished with ease even when the article to which the unevenness is to be transferred is large in size.

Figure 10:
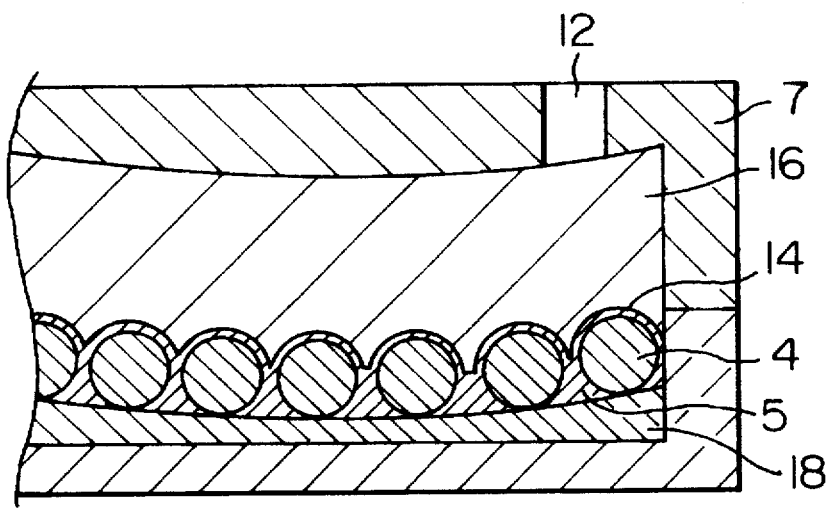
FIG. 10 is a diagrammatic sectional view illustrating the unevenness transfer method in the fourth embodiment of the present invention.
Figure 11:
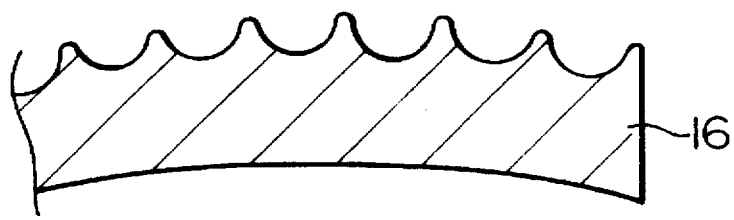
FIG. 11 is a sectional view of the resin after transfer of unevenness in the fourth embodiment of the present invention.
Figure 12:
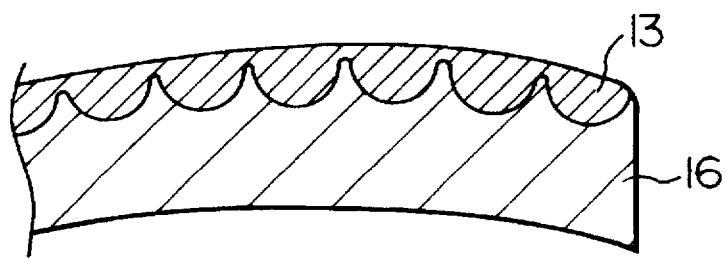
FIG. 12 is a sectional view showing a situation where a low-refractivity resin has been applied to the matrix resin surface after transfer of unevenness in the fourth embodiment of the present invention.

A fourth embodiment of the invention concerning its application to lens is described with reference to FIGS. 10 and 11. On a substrate 18 having a curvature are formed an ultrafine particle film comprising ultrafine particles 4 and a binder 5 and a water and oil repellent layer 14 according to the procedure in the first embodiment, and this substrate is placed in a mold for transfer 7. Then a liquid resin 16 with a release agent mixed therein is charged into the mold from an inlet opening 12 and heated for curing. After sufficiently cured, the cured resin 16 is taken out of the mold 7 to obtain a lens having an anti-reflection effect. The lens surface represents perfect transfer of the unevenness as shown in FIG. 11.

On the surface of this lens is formed a hard coating layer 13 made of a material with a lower refractivity than lens. This improves scuff resistance and weathering resistance essential for the lenses of eyeglasses without impairing the anti-reflection effect. This embodiment concerns a case where a thermosetting resin is used as matrix resin as in the first embodiment, but transfer can be similarly accomplished even when injection molding is carried out using a thermoplastic resin.

Figure 13:
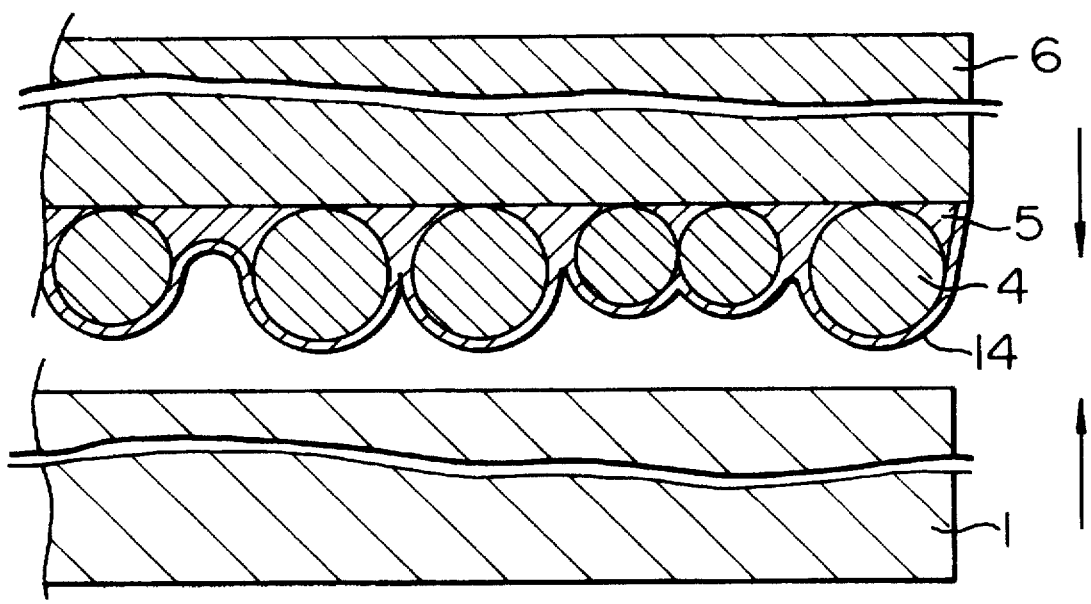
FIG. 13 is a diagrammatic sectional view illustrating the unevenness transfer method in the fifth embodiment of the present invention.
Figure 14:
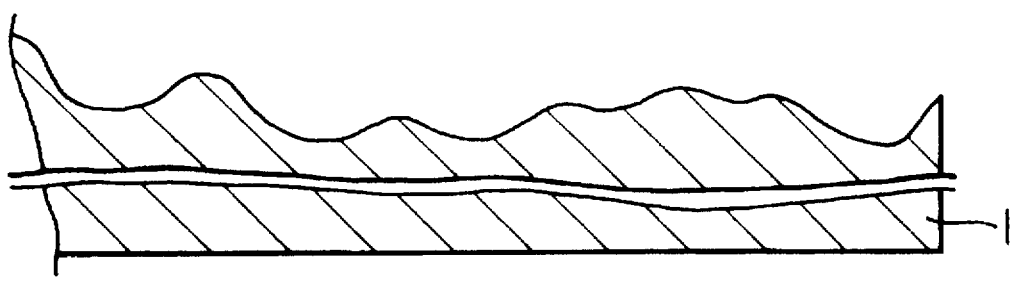
FIG. 14 is a sectional view of the resin after transfer of unevenness in the fifth embodiment of the present invention.
Figure 15:
FIG. 15 is a diagram illustrating the reflection preventing principle.
Figure 16:
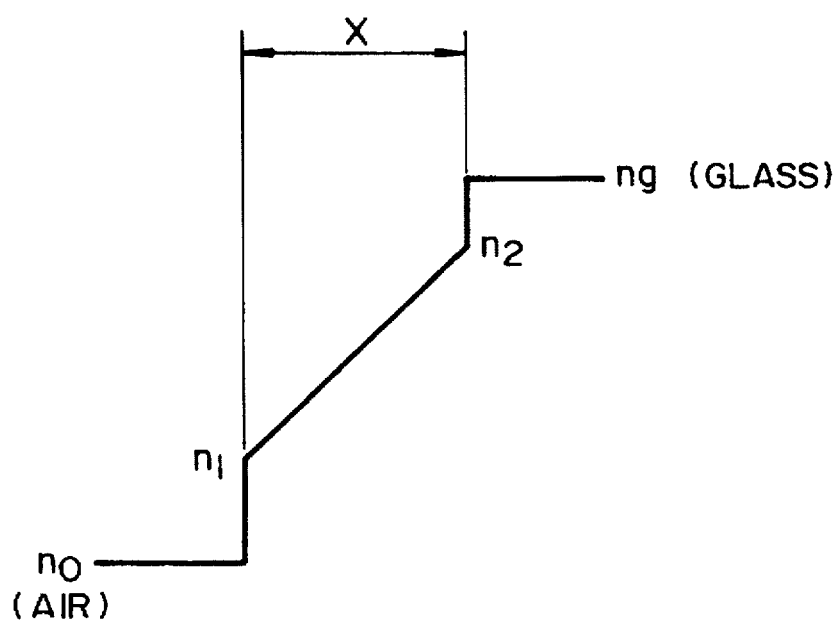
FIG. 16 is another diagram illustrating the reflection preventing principle.

A fifth embodiment of the invention is illustrated in FIGS. 13 and 14. In the first to fourth embodiments described above, there were used the ultrafine particles having a narrow distribution of the particle size, but the ultrafine particles used in the instant embodiment varied in size as shown in FIG. 13, and in this case, too, transfer could be accomplished excellently as in the above-described case using the ultrafine particles having a narrow distribution of the particle size. A sectional view of the resin after transfer is shown in FIG. 14. In this embodiment, it was possible to lower specular reflectance over the whole visible light range.

According to the present invention, as described above, it is possible to obtain a transparent article having an anti-reflection effect owing to fine surface unevenness formed by transfer of the configuration of the ultrafine particles and to produce various anti-reflection products by using said transparent articles as base.

Further, according to the present invention, it is possible to easily transfer the fine unevenness formed by the ultrafine particles to the surface of a transparent base article by using a substrate on which the ultrafine particles have been deposited as a monolayer.

What is claimed is:

1. A transparent article comprising a resin, characterized in that said transparent article has on its surface indentations formed by direct transfer of a configuration of ultrafine particles having a particle size of 40–600 nm, wherein said indentations are semi-spherical and have a diameter of 40–600 nm and a depth of 20–300 nm.

2. A transparent article having a resin layer provided on a transparent substrate, characterized in that the surface of said resin layer has indentations formed by direct transfer of a configuration of ultrafine particles having a particle size of 40–600 nm, wherein said indentations are semi-spherical and have a diameter of 40–600 nm and a depth of 20–300 nm.

3. A transparent article comprising a resin base, characterized in that said resin base has on its surface indentations formed by direct transfer of a configuration of ultrafine particles having a particle size of 40–600 nm, wherein said indentations are semi-spherical and have a diameter of 40–600 nm and a depth of 20–300 nm, wherein said indentations are coated with a transparent resin having a refractivity lower than the refractivity of said resin base.

4. A transparent article having a resin layer provided on a transparent substrate, characterized in that the surface of said resin layer has indentations formed by direct transfer of a configuration of ultrafine particles having a particle size of 40–600 nm, wherein said indentations are semi-spherical and have a diameter of 40–600 nm and a depth of 20–300 nm, wherein said indentations are coated with a transparent resin having a refractivity lower than the refractivity of said resin layer.

5. A transparent article according to claim 2 or 4, wherein said transparent substrate is made of glass or a plastic resin.

6. A transparent article according to claim 2 or 4, wherein said transparent substrate is selected from the group consisting of lens of eyeglasses, optical lenses, windshield, window glass, materials usable for show cases, show window and display cases for pictures, shields for gauges and shields for image display apparatus.

7. A transparent article according to claim 5, wherein said transparent substrate is selected from the group consisting of materials usable for show cases, show window and display cases for pictures, shields for gauges and shields for image display apparatus.

8. A transparent article according to claim 2 or 4 wherein said transparent substrate is ophthalmic glass, lens, windshield glass or window glass.

9. A transparent article according to claim 1 or 3, which is a plastic film.

10. An anti-reflection product comprising a transparent article capable of preventing or suppressing reflection of light, characterized in that said transparent article is one set forth in any of claims 1–4.

11. A protective plate for protecting an exhibit or a thing on display, characterized in that said protective plate comprises a transparent article set forth in any of claims 1–4.

12. A transparent article according to claim 3, wherein said transparent resin is a hard coating layer.

* * * * *

UNITED STATES PATENT AND TRADEMARK OFFICE
CERTIFICATE OF CORRECTION

PATENT NO.  :   5,709,922
DATED       :   January 20, 1998
INVENTOR(S) :   ONO et al It is certified that error appears in the above-identified patent and that said Letters Patent is hereby corrected as shown below:   On the title page: Item [30] should read:

[30] Foreign Application Priority Data
Dec. 27, 1993    [JP]   Japan ..... 5-330768

Signed and Sealed this

Twenty-sixth Day of May, 1998

Attest:

BRUCE LEHMAN

*Attesting Officer*                *Commissioner of Patents and Trademarks*